United States Patent

Reines et al.

[15] 3,657,485

[45] Apr. 18, 1972

[54] PABX REGISTER FOR ACQUIRING HUNDREDS INFORMATION FROM A TWO DIGIT IN-DIAL

[72] Inventors: Jose Reines, Glen Ellyn, Ill.; Walter L. Olson, Dunedin, Fla.

[73] Assignee: International Standard Electric Corporation, New York, N.Y.

[22] Filed: Apr. 27, 1970

[21] Appl. No.: 32,116

[52] U.S. Cl. ....................................179/18 EB, 179/18 AH

[51] Int. Cl. ....................................................H04q 3/62

[58] Field of Search ..........179/18 AH, 18 EB, 18 EA, 27 FE, 179/18 FH

[56] References Cited

UNITED STATES PATENTS 3,426,158 2/1969 Browne et al. ....................179/27 CA 2,739,184 3/1956 Baird et al. ........................179/18 FH

*Primary Examiner*—William C. Cooper

*Attorney*—C. Cornell Remsen, Jr., Walter J. Baum, Paul W. Hemminger, Charles L. Johnson, Jr., Delbert P. Warner and James B. Raden

[57] ABSTRACT

A register circuit in a PABX capable of accepting direct inward dialing is modified to generate hundreds digits when specific trunks are energized. The appearance of a signal over a selected one of the trunks will cause the register, in each instance, to produce a first digit in a hundreds counter. In this way, hundreds digits are supplied to the PABX without requiring an expenditure for a large number of additional selectors in the central office operating into the PABX. After the hundreds have been established, the tens and units digits are routed to appropriate tens and units counters.

8 Claims, 7 Drawing Figures

INVENTORS
WALTER LLOYD OLSON
JOSE REINES
BY Delbert A. Warner
ATTORNEY

PABX REGISTER FOR ACQUIRING HUNDREDS INFORMATION FROM A TWO DIGIT IN-DIAL

The present invention relates to a PABX register circuit for acquiring hundreds digit information from a central office which supplies actual digital signals only for units and tens. It particularly relates to electronic circuits sensitive to the presence of a potential over one of a plurality of trunks for providing hundreds information and which then senses pulses over the same trunk to provide tens and units information.

A problem associated with the use of PABX's having direct in-dialling capabilities and involving more than one hundred lines but fewer than a thousand lines is that of supplying calling information for the hundreds digits. A severe economic penalty may be inflicted on any central office working into such a PABX, since the numbering plan of the PABX requires three digits and the central office must dedicate selectors for 1,000 numbers to the PABX. If the PABX has, for example, only 120 lines, equipment necessary to supply 880 numbers will be wasted.

The prior art which has dealt with this problem has been related to electro-mechanical equipment and necessarily has entailed the use of electro-mechanical elements. The present invention relates to an electronic switching system using a PNPN matrix and requires electronic elements for speed of operation and other aspects of compatibility.

It is an object of the present invention to overcome this need for excessive equipment in the central office. It is a further object of this invention to provide electronic means to overcome this need for excessive equipment.

The foregoing objects and others ancillary thereto are preferably accomplished by grouping trunks from the central office so that all "two-hundred" lines are received over a first trunk, all "three-hundred" lines are received over a second trunk and so forth. The PABX register is arranged at the same time, to treat first signals over a trunk as an indication of a respective hundreds digit which is stored then in an appropriate hundreds register. The tens and units digits are then received over the same trunk and stored in appropriate tens and units registers.

Figure 5:
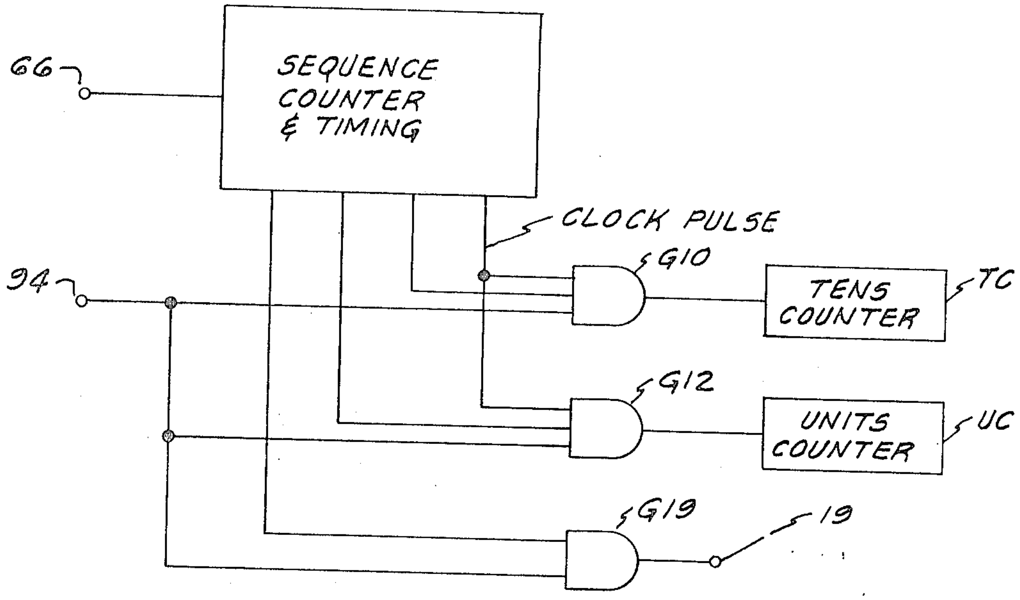

The novel features that we consider to be characteristic of our invention are set forth with particularity in the appended claims. The invention itself, however, both as to its organization and its method of operation, together with additional objects and advantages thereof, will be best understood from the following description of a specific embodiment when read in conjunction with the accompanying drawings, in which FIG. 1 is a block diagram illustrating the use of three digits for direct in-dialling to an electronic switching system, FIG. 2 is a block diagram illustrating principles of the present invention and showing certain relationships between a register and incoming trunk lines as used in the practice of this invention, FIG. 3 is a block diagram illustrating in more detail the relationships between three-digit direct in-dialing and two-digit direct in-dialing as they apply in consideration of the present invention, FIGS. 4, 4*a* and 4*b* illustrate details of a preferred embodiment of the invention, and FIG. 5 is a diagram illustrating further details of the counter control logic and counter of FIG. 4.

Figure 1:
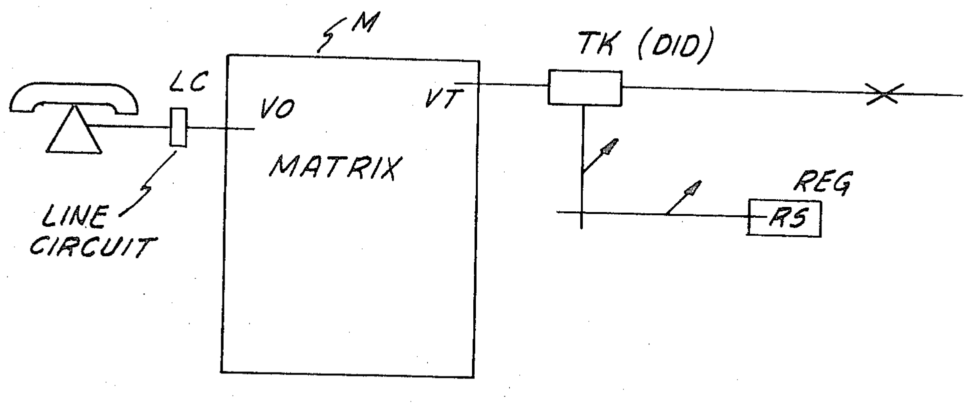

FIG. 1 illustrates how an electronic switching system may be organized for the purpose of receiving three-digit DID (direct in-dialing) calls. In this example, all digits received over the incoming trunk TK are registered in a register REG through a by-link. The concentration points of the by-link appear at the registers as indicated by the labels RS. From each concentration points RS a PNPN path is established through the matrix M to all trunks served by the register.

Figure 2:
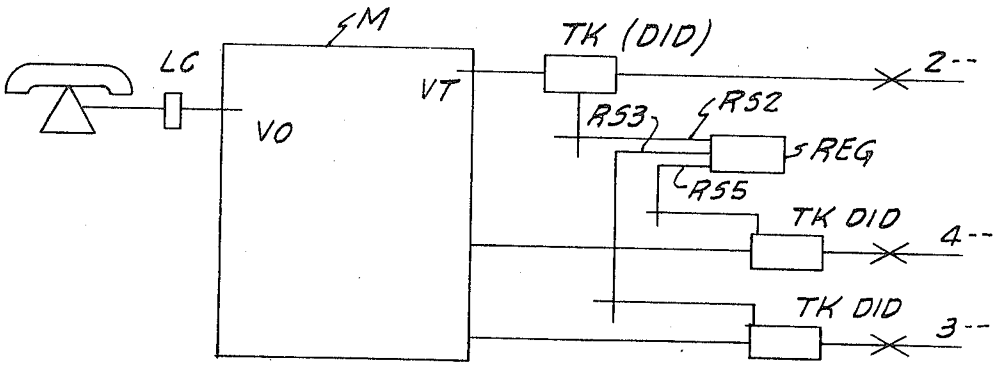
Figure 3:
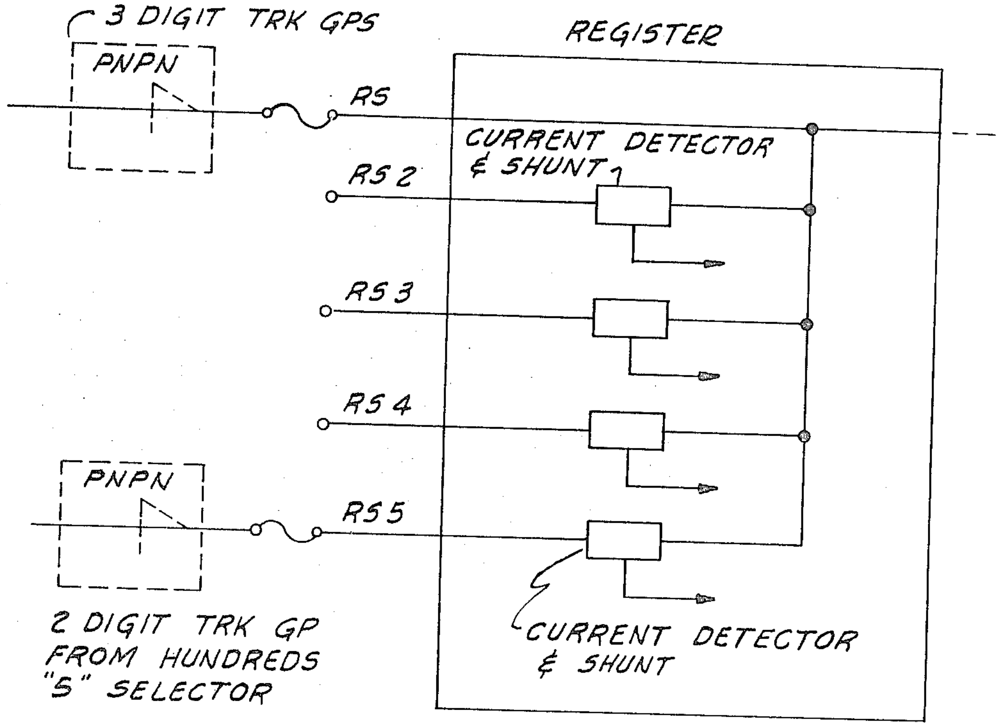

FIG. 2 shows the inventive approach taken for two-digit direct in-dial. The register is modified to accept such two-digit in dialing. To the RS concentration points are added RS2, RS3, RS4, and RS5 inputs, as indicated in more detail in FIG. 3. PNPN diodes from each trunk are connected at a strapping field to the appropriate concentration points RS or RS2, RS3, RS4, and RS5, as required.

Figures 4, 4A:
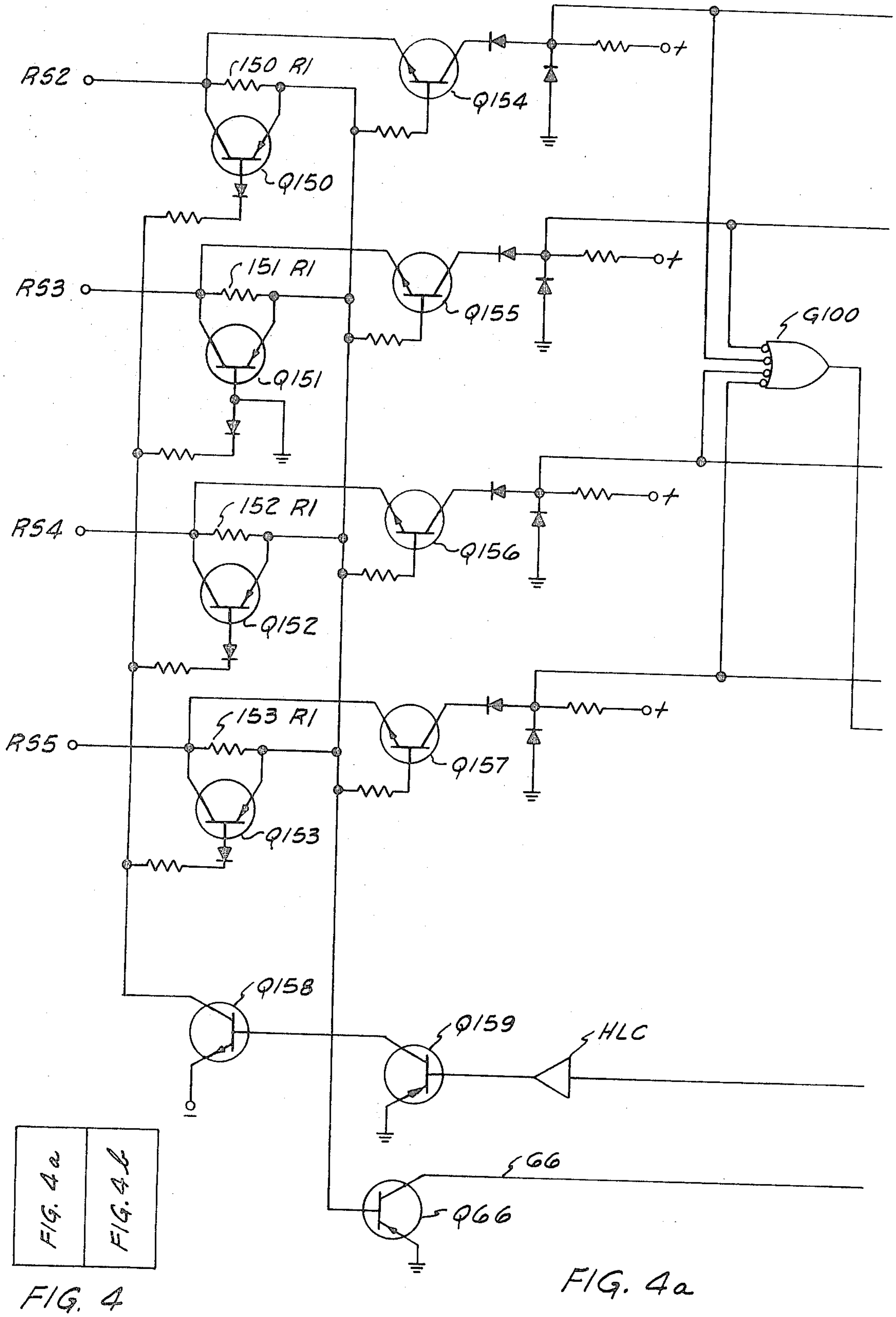
Figure 4B:
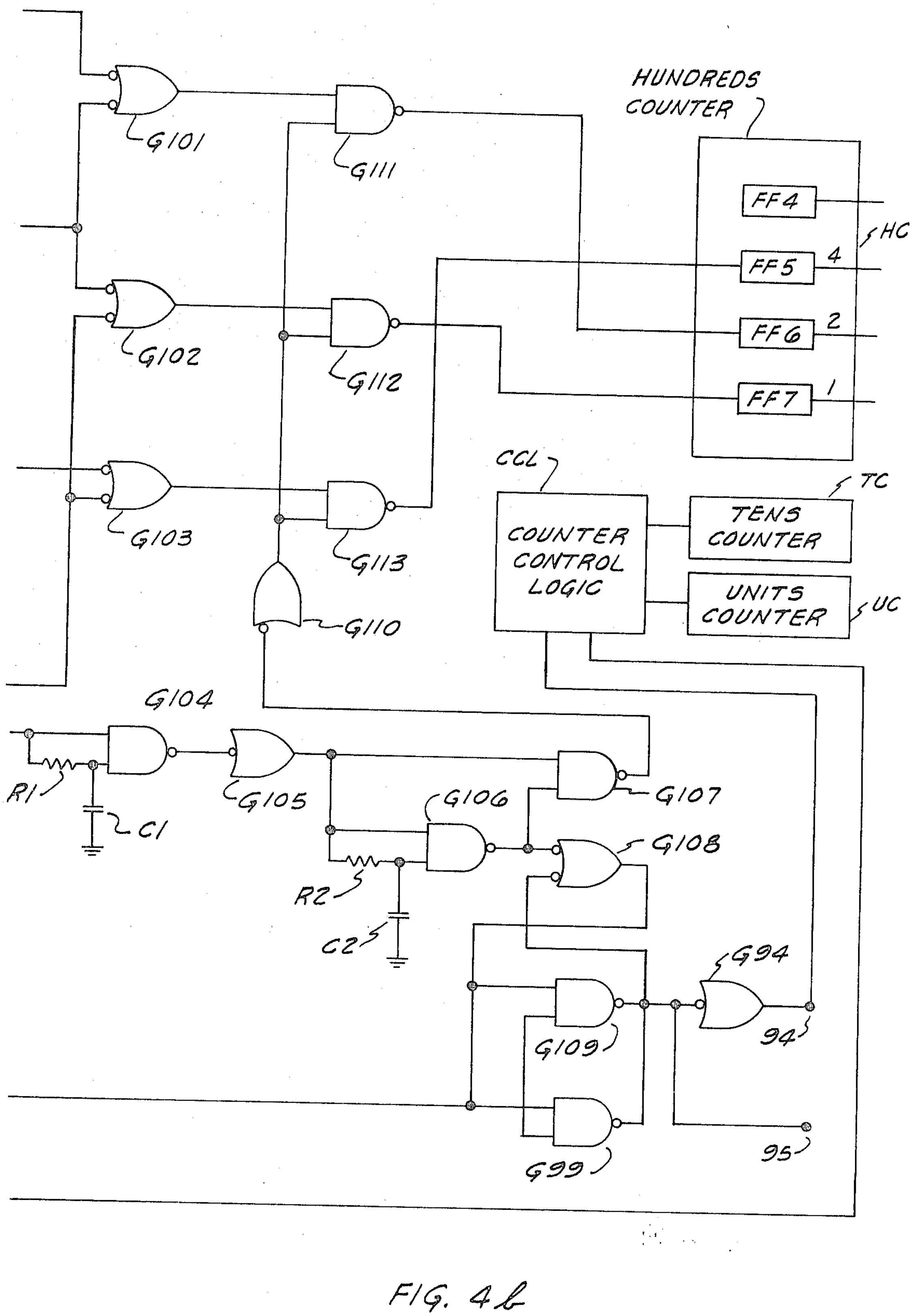

Turning to FIG. 4, a detailed diagram of a portion of a register circuit in accordance with the invention is presented. At the left are shown four terminals RS2, RS3, RS4, and RS5, each of which may be connected to a trunk group. Each trunk accesses 100 lines (00 – 99). Each of these trunks, in turn, is dedicated to a particular hundreds group of lines e. g., RS2 may be dedicated to the "two-hundred" series and RS3 to the "three-hundred" series. This means that any direct in-dialed call involving the digit "2" in the hundreds position will come into the register via connection RS2, any in-dialed call involving "3" in the hundreds position will come into the register via connection RS3, etc.

Assume a register is needed by a trunk in the group of trunks connected to lead RS2. In the idle state, the lead RS2 is marked with +18.5 volts. When the trunk fires the matrix M(FIG. 1), current flows through 150R1 to turn Q154 "on." This places a logic 0 on OR gate G101 and a logic 1 on AND gate G111. A logic 0 is also placed on OR gate G100 and after a delay (caused in part by R1C1), gates G104, G105, G107 and G110 place a logic 1 on the other input of AND gate G111. Gate G111 then inserts a pulse representing the number "2" in flip-flop FF6 of the hundreds counter HC.

After another delay occasioned in part by R2C2, the flip-flop G108-109 is set. G109 places a logic 0 on gate G94 which provides an output at a terminal 94. The output on 94 is then available for use by a counter control logic at CCL in preparing tens and units counters, shown as blocks at TC and UC, to accept tens and units digits in the usual manner. At this same time, Q158 is turned "on" via an amplifier HLC and the transistor Q159. Q158 turns "on" Q150 as well as Q151, Q152, and Q153, to shunt out resistors 150R1, 151R1, etc. and turn Q154, Q155, etc. and Q66 off. Outputs from terminals 66 and 94 are then applied through electronic logic circuits at CCL to enable the application of succeeding tens and units digits to the respective tens and units counter.

Assume a register is needed by a trunk in the group of trunks connected to lead RS3 and the system is idle. When the trunk fires the matrix, current flows through 151R1 to turn Q155 "on." This places a logic o on OR gates G101 and G102 as well as a logic 1 on AND gates G111 and G112. A logic o is also placed on OR gate G100 and after a delay, occasioned by R1-C1, gates G104, G105, G107 and G110 place a logic 1 on the other inputs of G111 and G112. G111 and G112 then insert the number "3" into the hundreds counter by pulsing flip-flop FF6 for binary "two" and flip-flop FF7 for binary "one."

After another delay, the flip-flop G108-G109 is set. G109 places a logic o on gate G94 which provides an output at the terminal 94. At this same time, Q158 is turned "on" via the amplifier HLC and transistor Q159. Q158 turns Q151 "on" to shunt out the resistor 151R1 and turn both Q155 and Q66 "off." Outputs from terminals 66 and 94 are then applied through system control logic at CCL to enable the tens counter and units counter to accept the tens and units digits.

The system control logic is indicated in greater detail in FIG. 5. In this figure, outputs at terminals 66 are used to control a sequence counter and timing circuits so that pulses representing tens and units digits are extended through the gates G10 and G12 in the proper sequenct to the tens counter TC and the units counter UC, respectively. When the count terminates, logic one is applied to each terminal of the AND gate G19 to supply a terminate signal at terminal 19.

While the principles of the invention have been described above in connection with specific apparatus and applications, it is to be understood that this description is made only by way of example and not as a limitation on the scope of the invention.

We claim:

1. A register circuit for receiving two-digit in-dialed signals and for generating a third digit to indicate the hundreds place, comprising a lead for receiving a signal over a trunk dedicated to a particular "hundreds" call number, and, electronic means connected to said lead and responsive to said signal to provide a further signal to set a particular "hundreds" digit in a hundreds counter.

2. A register circuit as claimed in claim 1, in which the electronic means connected to the lead includes a first transistor having a resistor coupled across its emitter and collector terminals to permit the flow of current therethrough and to fire a second transistor, said second transistor providing a control signal to logic means, and said logic means responding to the control signal to generate said further signal to set the hundreds counter.

3. A register circuit as claimed in claim 2, in which said logic means includes gate circuits, responsive to said control signal after a time delay, to turn said first transistor "on" thereby shunting out the resistor across emitter and collector terminals of the first transistor and preparing a circuit over which signals representing tens and units digits may be received.

4. A register circuit as claimed in claim 2, in which the logic means includes AND and OR gates wired between the second transistor and a hundreds counter to supply a signal to selected flip-flops in the hundreds counter and provide the desired indication of a hundreds signal from the selected flip-flops.

5. A register circuit as claimed in claim 2, in which the logic means includes means for turning off the signal to the hundreds counter, and means for supplying subsequent signals received over said lead successively to tens and units counters.

6. A register circuit as claimed in claim 2, in which the logic means includes a gate circuit responsive to selected signals to supply a count terminate signal.

7. A register circuit for receiving a signal indicating that a "-hundreds" digit is needed in a call number and for supplying the missing digit to a hundreds counter comprising a lead for receiving a signal indicating that a hundreds digit is missing, and means for routing said signal from the lead to operate an element in a hundreds counter.

8. A register circuit as claimed in claim 7 in which the means for routing said signal includes transistor means shunted by a resistor to pass said signal and logic means responsive to said signal to turn said transistor "on" to thereby reroute said signal to prepare means to receive pulses representing tens and units digits.

* * * * *